United States Patent
Gao et al.

(10) Patent No.: US 11,632,684 B2
(45) Date of Patent: Apr. 18, 2023

(54) SYSTEMS AND METHODS FOR ROBUST BEAM REPORTING

(71) Applicant: ZTE CORPORATION, Guangdong (CN)

(72) Inventors: Bo Gao, Guangdong (CN); Yijian Chen, Guangdong (CN); Yu Ngok Li, Guangdong (CN); Zhaohua Lu, Guangdong (CN); Yifei Yuan, Guangdong (CN); Xinhui Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/711,257

(22) Filed: Dec. 11, 2019

(65) Prior Publication Data

US 2020/0120528 A1 Apr. 16, 2020

Related U.S. Application Data

(63) Continuation of application No. PCT/CN2017/088773, filed on Jun. 16, 2017.

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04L 5/0051* (2013.01); *H04L 5/10* (2013.01); *H04W 72/046* (2013.01)

(58) Field of Classification Search
None
See application file for complete search history.

(56) References Cited

U.S. PATENT DOCUMENTS

2016/0285660 A1 9/2016 Frenne et al.
2018/0098234 A1* 4/2018 Kim ..................... H04B 7/0478
(Continued)

FOREIGN PATENT DOCUMENTS

CN 105340190 A 2/2016
WO 2016182528 A1 11/2016

OTHER PUBLICATIONS

Guangdong Oppo Mobile Telecom "Discussion on the Group-based reporting" R1-1704607, 3GPP TSG RAN WG1 Meeting 88bis, Spokane, WA, Apr. 7, 2017, 5 pages.
(Continued)

*Primary Examiner* — Scott M Sciacca
(74) *Attorney, Agent, or Firm* — Duane Morris LLP

(57) ABSTRACT

A system and method for performing robust beam reporting is disclosed. In one embodiment, a method performed by a first communication node includes: receiving at least one reference signal; determining at least one reference signal received power (RSRP) value associated with the at least one reference signal; generating a RSRP report in accordance with a predetermined format that groups the at least one RSRP value into N sets of RSRP values, each set containing at least one RSRP value, and associates each of the N sets of RSRP values with a respective one of N sets of resource groups, wherein each set of resource groups contains at least one resource group, and N is a positive integer; and transmitting the RSRP report.

16 Claims, 9 Drawing Sheets

(51) Int. Cl.
  *H04L 5/00*     (2006.01)
  *H04W 72/04*    (2009.01)
  *H04L 5/10*     (2006.01)
  *H04W 72/044*   (2023.01)

(56) References Cited

U.S. PATENT DOCUMENTS

2018/0102817 A1*  4/2018  Park ................... H04B 7/04
2018/0248601 A1*  8/2018  Kishiyama ........... H04W 24/10
2020/0059921 A1*  2/2020  Karjalainen ......... H04B 7/063
2020/0068420 A1*  2/2020  Chen ................. H04W 36/00

OTHER PUBLICATIONS

ZTE "UE reporting for beam management" R1-1701800, 3GPP TSG RAN WG1 Meeting 88, Athens, Greece, Feb. 17, 2017, 6 pages.
ZTE "Discussion on DL beam management" R1-1704398, 3GPP TSG RAN WG1 Meeting 88bis, Spokane, WA, Apr. 7, 2017, 12 pages.

\* cited by examiner

SYSTEMS AND METHODS FOR ROBUST BEAM REPORTING

CROSS-REFERENCE TO RELATED APPLICATION

The present application claims priority to PCT international application PCT/CN2017/088773, entitled "SYSTEMS AND METHODS FOR ROBUST BEAM REPORTING," filed on Jun. 16, 2017, which is expressly incorporated by reference herein in its entirety.

TECHNICAL FIELD

This disclosure relates generally to wireless communications and, more particularly, to systems and methods for beam reporting.

BACKGROUND

Beam reporting may be a process in wireless communications where a base station (BS) that sends a beam to user equipment (e.g., a mobile phone or other personal device) may receive feedback, from the user equipment (UE), concerning the beam. This feedback may be utilized for calibration of future beams sent from the base station to the user equipment (UE). These future beams may be calibrated to include user information for receipt by the UE.

Various BSs, such as a next generation nodeB (gNodeB or gNB), may have a multiple-in-multiple-out (MIMO) antenna array (e.g., panel array). A MIMO antenna array (e.g., panel array) may include a large number of antenna elements, such as 1024 antenna elements. These antenna elements may be arranged on at least one panel antenna, which may be a two dimensional array of these antenna elements.

As discussed above, beam reporting may provide feedback to the BS concerning beams that may be utilized for communication with a UE. A report on reference signal received power (RSRP) is an example of such feedback. RSRP may be a measure of a beam's power as received by the UE, and may be expressed as a value (such as in watts). The BS may determine which beams are suitable or "best" for communications with a UE based on the RSRP value (e.g., by maximizing the RSRP value).

RSRP may be determined from a reference signal (RS), encoded in a beam, on a per antenna port basis. An antenna port, also termed more simply as a port, may be a smallest logical representation of a channel that is conveyed by one or more antennas. In other words, an antenna port ID can serve as an ID for signals transmitted by that antenna port, which can correspond to one or more antenna elements. For example, a gNB may transmit RSs, such as a channel state information reference signal (CSI-RS,) for one antenna port. Subsequently, a UE may receive this RS (e.g., the CSI-RS) associated with this antenna port and calculate the corresponding RSRP. Typically, an RSRP is determined as a linear average of the power of a resource element (RE) on which the RS (e.g., the CSI-RS) is transmitted as part of a beam.

However, as wireless communications evolve to become increasingly complex and sophisticated, traditional determinations of RSRP may not provide sufficient information or granularity to provide meaningful information for beam reporting. For example, differences between a BS's transmitted beams may be more accurately expressed based upon a particular antenna orientation, such as polarization, rather than which antenna port the beam is associated with. Therefore, there is a need for improved methods of beam reporting.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a first communication node includes: receiving at least one reference signal; determining at least one reference signal received power (RSRP) value associated with the at least one reference signal; generating a RSRP report in accordance with a predetermined format that groups the at least one RSRP value into N sets of RSRP values, each set containing at least one RSRP value, and associates each of the N sets of RSRP values with a respective one of N sets of resource groups, wherein each set of resource groups contains at least one resource group, and N is a positive integer; and transmitting the RSRP report.

In a further embodiment, a method performed by a first communication node includes: sending at least one reference signal; receiving a reference signal received power (RSRP) report comprising at least one RSRP value associated with the at least one reference signal, wherein the RSRP report is formatted in accordance with a predetermined format that groups the at least one RSRP value into N sets of RSRP values, each set containing at least one RSRP value, and associates each of the N sets of RSRP values with a respective one of N sets of resource groups, wherein each set of resource groups contains at least one resource group, and N is a positive integer; determining if the at least one RSRP value meets a predetermined criterion; and responsive to the at least one RSRP value meeting the predetermined criterion, sending a transmission signal using at least one resource element used to send the at least one reference signal.

In another embodiment, a first communication node includes: a receiver configured to receive at least one reference signal from a second communication node; at least one processor configured to: determine at least one reference signal received power (RSRP) value associated with the at least one reference signal; and generate a RSRP report in accordance with a predetermined format that groups the at least one RSRP value into N sets of RSRP values, each set containing at least one RSRP value, and associates each of the N sets of RSRP values with a respective one of N sets of resource groups, wherein each set of resource groups contains at least one resource group, and N is a positive integer; and a transmitter configured to transmit the RSRP report to the second communication node.

In yet another embodiment, a first communication node includes: a transmitter configured to transmit at least one reference signal to a second communication node; a receiver configured to receive a reference signal received power (RSRP) report from the second communication node, wherein the RSRP report contains at least one RSRP value associated with the at least one reference signal, and groups the at least one RSRP value into N sets of RSRP values, each set containing at least one RSRP value, and associates each of the N sets of RSRP values with a respective one of N sets of resource groups, wherein each set of resource groups contains at least one resource group, and N is a positive integer; and at least one processor configured to: determine if the at least one RSRP value meets a predetermined criterion; and when the at least one RSRP value meets the predetermined criterion, cause the transmitter to send a transmission signal to the second communication node using at least one resource element used to send the at least one reference signal.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
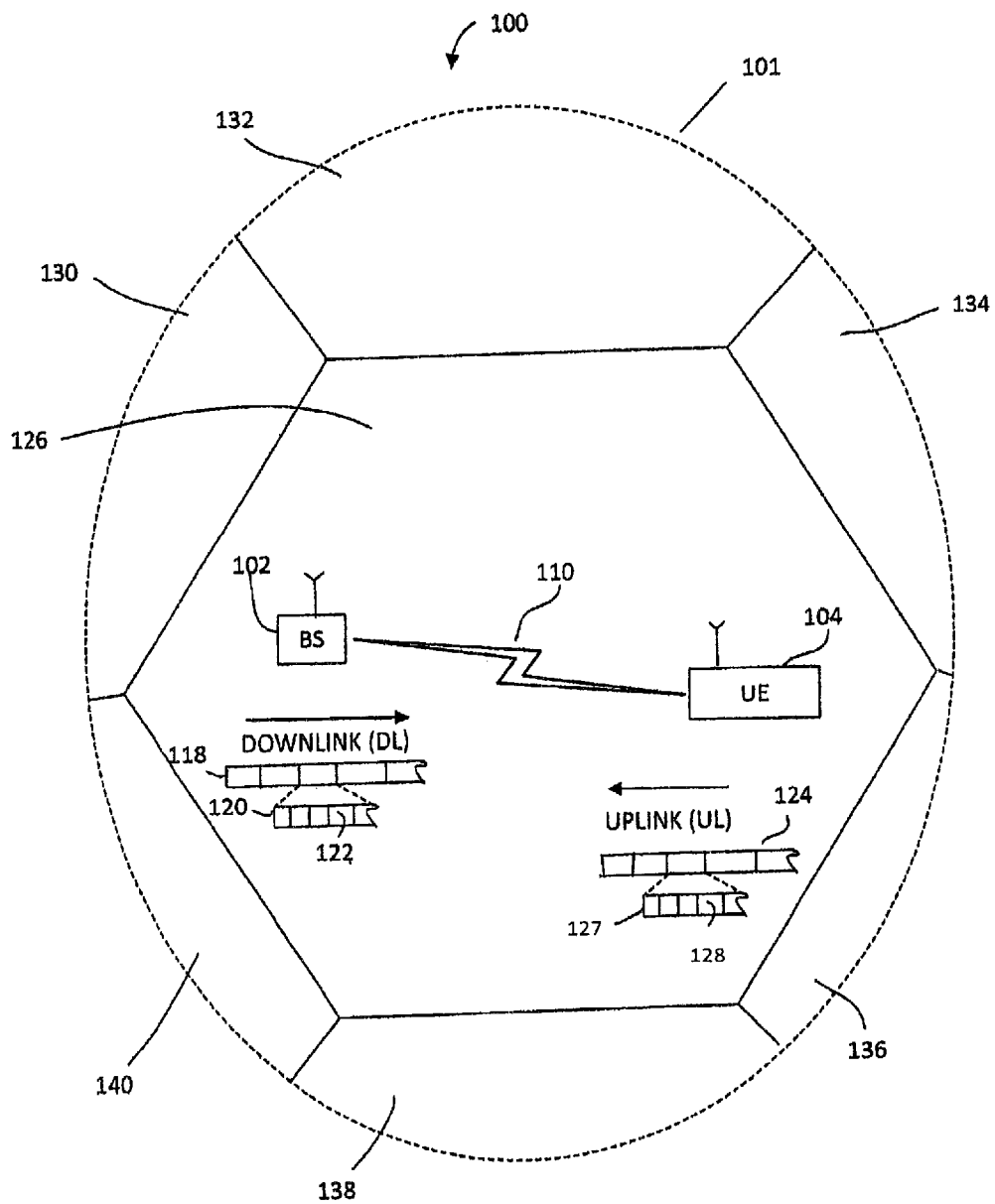
FIG. 1 illustrates an exemplary cellular communication network in which techniques disclosed herein may be implemented, in accordance with various embodiments of the present disclosure.

FIG. 1 illustrates an exemplary wireless communication network 100 in which techniques disclosed herein may be implemented, in accordance with an embodiment of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station (BS) operating at its allocated bandwidth to provide adequate radio coverage to its intended users. For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the base station (BS) 102 and user equipment (UE) 104 are described herein as non-limiting examples of "communication nodes," generally, which can practice the methods disclosed herein. Such communication nodes may be capable of wireless and/or wired communications, in accordance with various embodiments of the invention.

In network 100, a signal transmitted from the BS 102 may suffer from the environmental and/or operating conditions that cause undesirable channel characteristic, such as Doppler spread, Doppler shift, delay spread, multipath interference, etc. mentioned above. For example, multipath signal components may occur as a consequence of reflections, scattering, and diffraction of the transmitted signal by natural and/or man-made objects. At the receiver antenna 114, a multitude of signals may arrive from many different directions with different delays, attenuations, and phases. Generally, the time difference between the arrival moment of a first received multipath component (typically the line of sight (LOS) component) and the last received multipath component (typically a non-line of sigh (NLOS) component) is called delay spread. The combination of signals with various delays, attenuations, and phases may create distortions such as inter-symbol interference (ISI) and inter-channel interference (ICI) in the received signal. The distortion may complicate reception and conversion of the received signal into useful information. For example, delay spread may cause ISI in the useful information (data symbols) contained in the radio frame 124.

Figure 2:
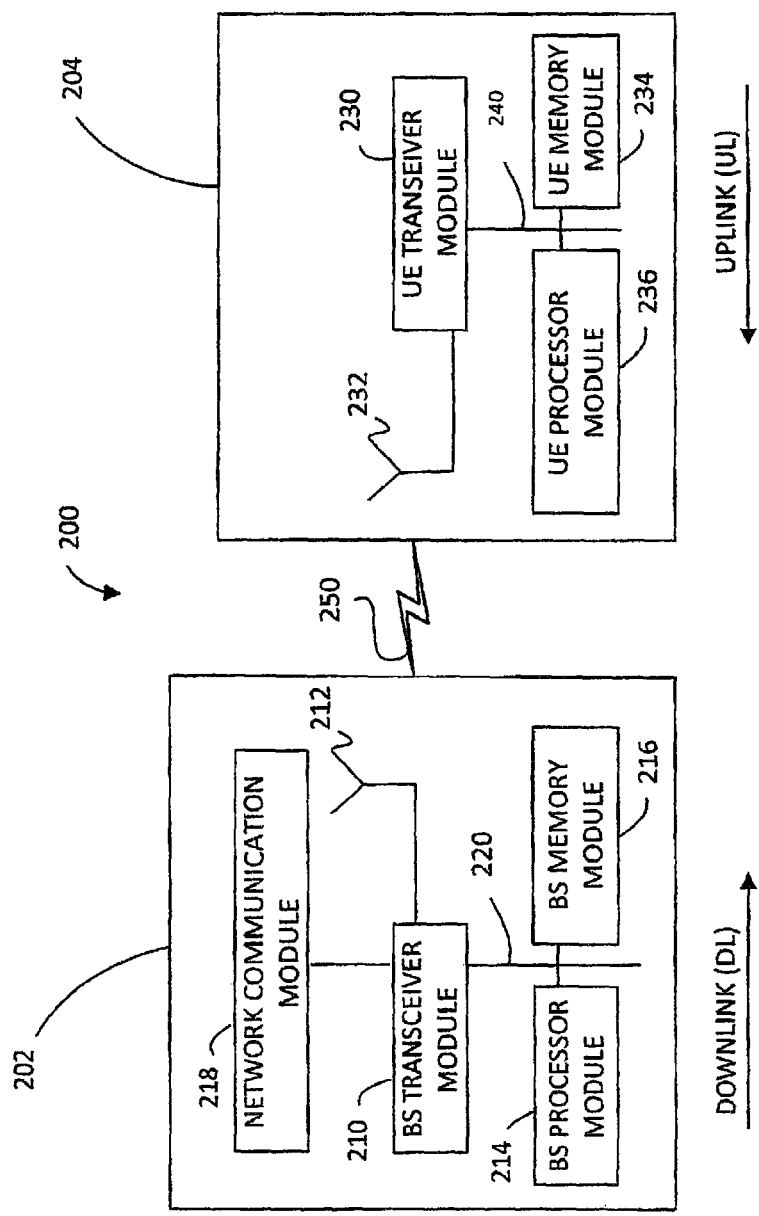
FIG. 2 illustrates block diagrams of an exemplary base station and user equipment device, in accordance with some embodiments of the invention.

FIG. 2 illustrates block diagrams of an exemplary system 200 including a base station (BS) 202 and user equipment (UE) 204 for transmitting and receiving wireless communication signals, e.g., OFDM/OFDMA signals, between each other. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel (e.g., link) 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 210 are configured to support industry standards such as the Long Term Evolution (LTE) and emerging 5G and New Radio (NR) standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

In order to meet the performance requirements of International Mobile Telecommunications (IMT)-Advanced systems, the LTE/LTE-Advanced standards have offered several features to optimize radio networks in the frequency, time and/or spatial domains. With the continuing evolutions of wireless technologies, it is expected that future radio access networks will be able to support the explosive growth of wireless traffic. Among these features, widening the system bandwidth is one straightforward way to improve the link and system capacity, which is already being tested and confirmed by the deployment of carrier aggregation in LTE-Advanced systems.

As the demand for capacity increases, mobile industries as well as academia have become more interested in increasing system bandwidths to greater than 100 MHz. Additionally, because spectrum resources operating below a frequency of 6 GHz have become more congested, high-frequency communications above 6 GHz are well-suited to support system bandwidths of more than 100 MHz, or even up to 1 GHz.

In some embodiments, communications between a base station and a UE are implemented with signal frequencies greater than 6 GHz, which are also called "millimeter wave communications." When using wide or ultra wide spectrum resources, however, a considerable propagation loss can be induced by high operating frequencies (i.e., greater than 6 GHz). To solve this, antenna array (e.g., panel array) and beamforming (BF) training technologies using Massive MIMO, e.g., 1024 antenna elements for one node, have been adopted to achieve beam alignment and obtain sufficiently high antenna gain. To keep implementation costs down while benefiting from antenna array technologies, analog phase shifters have become attractive for implementing mm wave beam forming (BF), which means that the number of phases is finite and other constraints (e.g., amplitude constraints) can be placed on the antenna elements to provide variable-phase-shift based BF. Given such pre-specified beam patterns, e.g., the antenna weight vector (AWV) codebook, the variable-phase-shift-based BF training targets to identify the best-N beams, for subsequent data transmission can be determined.

As introduced above, beam reporting may be a process in wireless communications where the BS may send a beam to a UE and receive feedback, from the UE, concerning the beam. This feedback may be utilized for calibration of future beams sent from the BS to the UE. These future beams may be calibrated to include user information for receipt by the UE.

Systems and methods in accordance with various embodiments may implement robust beam reporting. Robust beam reporting may include a feedback loop between BSs and UEs that provides sufficient communications details concerning a BS to a UE or, vice versa, concerning a UE to a BS. These communication details may inform, or instruct, the BS or UE to perform highly efficient, calibrated communications that take into consideration all relevant communication details of the BS or UE (when compared to systems that do not implement robust beam reporting). Communication details may be any aspect of communication of a first communication node (e.g., a BS or UE) that may be utilized to calibrate a second communication node (e.g., a counterpart UE or BS) to improve communication between the two communication nodes. Examples of communication details may include: a number and/or layout of ports at either the UE or BS; port IDs (e.g., identity of ports) at either the UE or BS; channel estimation protocols for channel estimation by a UE (e.g., RSRP determination); formatting for a channel estimation report (e.g., a RSRP report, or a report of RSRP values); transmitter beam (Tx beam) sets (e.g., a set of beams transmitted from a BS to a UE); received beam (Rx beam) sets (e.g., a set of beams transmitted from a UE to a BS); antenna groups; antenna orientations (e.g., polarization and/or direction an antenna is pointing); RSs that may be used for channel estimation; weights (e.g., priorities) for different RSs that may be used for channel estimation; RS transmission properties; number of independent data streams (e.g., ranks, or layers) supported by port groups, antenna groups, beam sets, etc.; customized RSRP definitions; partial bandwidths for determination of RSRP; and the like. Further discussion of each of these and other communication details will be discussed further below.

As an example of robust beam reporting, in accordance with various embodiments, a BS may transmit a plurality of beams for reception within the BS's cellular coverage area. At least one of the plurality of beams may be received by a UE. The received beam may include instructions concerning a channel estimation protocol and/or a reference signal for which channel estimation may be performed at the UE. Optionally, in certain embodiments, the UE may not need external instructions but may independently select a channel estimation protocol that it may perform in response to selection criteria (e.g., by being preprogrammed to perform a particular channel estimation protocol, or based upon available processing resources). The channel estimation protocol may instruct the UE how to perform channel estimation to generate communication details that may be fed back (e.g., sent) to the BS to improve communications between the BS and UE. Channel estimation may be any type of measurement, calibration, determination or other process that produces a result (e.g., parameter value) that may be included in a channel estimation report. Stated another way, channel estimation may be a process by which a value for a parameter is determined (e.g., what RSRP values should be included in a combined RSRP value, the number of independent data streams supported by a particular UE port group, a customized RSRP definition, and the like). The channel estimation protocol may also instruct the UE as to the data structure, or formatting, for a channel estimation report that may be sent (e.g., fed back) to the BS. The channel estimation report may be an indication of at least one of the parameters (as parameter values) determined during the instructed channel estimation. For example, the channel estimation protocol may instruct the UE to send the BS a channel estimation report that includes an RSRP value for certain port groups in particular Rx beam sets, as will be referenced in Type-B2 embodiments discussed further below. The BS may transmit user data for the UE based on the received report. For example, the BS may transmit user data for the UE on the particular beam if the RSRP of the report indicates a power value of the particular beam meets a predetermined criterion.

As will be discussed further below, a reference signal received power (RSRP) may be a measure of a power level, in watts, based on a received signal. RSRPs may be determined at a UE and be based upon a received reference signal (RS) from a BS. Also, as will be discussed further below, a RS may be any type of signal that may be used as a reference for determination of an RSRP, channel state information (CSI), or any other channel estimation. Examples of RSs may include a downlink (DL) demodulated reference signal (DMRS), an uplink (UL) DMRS, DMRS of a physical broadcast channel (PBCH), phase tracking reference signal (PT-RS), tracking reference signal (TRS), sounding reference signal, secondary synchronization signal (SSS), primary synchronization signal (PSS), SS block (e.g., one or more of the PSS, SSS or DMRS of the PBCH, which can share the same transmission (Tx) beam), CSI-RS, and the like.

Accordingly, for clarity of discussion to relate communication details to RSRP, RSRP determination may be a type of channel estimation based on RSs. RSRP may be a type of parameter and an RSRP value may be a type of parameter value. Also, a RSRP report (which may include RSRP values) may be a type of channel estimation report.

In certain embodiments, an RSRP may be the linear average over the power contributions (in Watts) of the resource elements that carry cell-specific reference signals (RS) within the considered measurement frequency bandwidth. For RSRP determination the cell-specific RS R0 (corresponding to a first port of a BS transmitting the RS) may be used. However, if a UE can reliably detect that R1 (corresponding to a second port of the BS transmitting the RS, for example) is available, then the UE may use R1 in addition to R0 (corresponding to a first port of the BS transmitting the RS) to determine RSRP. Furthermore, if higher layers (e.g., layers in the open systems interconnection (OSI) model) indicate measurements based on discovery signals, the UE may measure RSRP of the subframes used to transmit the discovery signals. However, if the UE can reliably detect that cell-specific RSs are present in other subframes, the UE may measure RSRP for those other subframes in addition to measuring RSRP for the subframes used to transmit the discovery signals. In terms of a physical measurement of RSRP, a reference point for the RSRP may be at the physical antenna connector of the UE performing the RSRP determination. In particular embodiments, if receiver diversity is in use by the UE, a reported value of RSRP may be set to not be lower than a corresponding RSRP of any of the individual diversity branches (e.g., any of the receiver (Rx) chains, such as one or more independent receiver baseband processing units for MEMO diversity).

In certain types of wireless communications standards, such as 5G New Radio (NR), base stations (BS), also referred to herein as a "gNB," may include an antenna layout that includes multiple panel antennas. Also, UEs may also include an antenna layout that includes multiple panel antennas. Generally, a panel on either a BS or a UE may have at least two transceiver units (TXRU), which may associated with different polarizations. In various embodiments, in order to achieve high rank transmission (e.g., a transmission with a high number of independent layers, or number of data streams), a BS and UE may use different beams generated from the different panels. The beams utilized may cover a full range of communication capabilities of each panel, and associated TXRUs. Stated another way, a BS and UE may be fully utilized when all of their communication capabilities are used, such as by using all of the panel antennas of the BS and UE. For example, a UE with four panels would be underutilized if it uses less than all of its panels to receive signals from a BS and/or generates a report based on channel estimation on signals received on less than all of its panels. Similarly, there would be underutilization if the UE reports only on transmission (Tx) beams from the BS associated with only one BS panel, as opposed to all of the BS's multiple panels.

Figure 3:
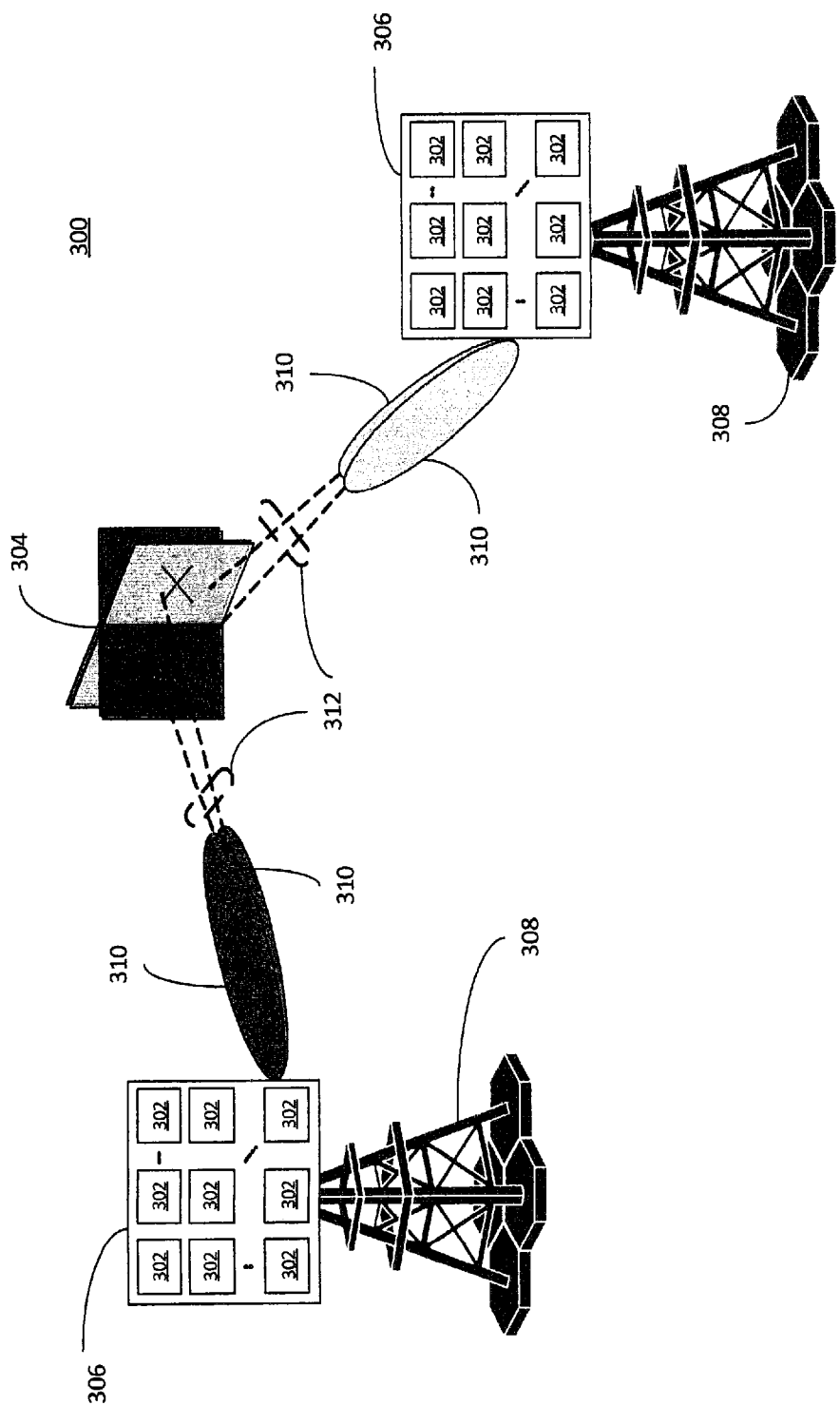
FIG. 3 illustrates a network diagram of base station panel antennas transmitting to user equipment panel antennas, in accordance with some embodiments.

FIG. 3 illustrates a network diagram 300 of base station panel antennas 302 transmitting to user equipment panel antennas 304, in accordance with some embodiments. The base station (BS) panel antennas 302 may be part of a rectangular panel array 306 that is part of a base station 308. Accordingly, the panel array 306 may include a plurality of BS panel antennas 302. Although only nine BS panel antennas 302 are illustrated for each panel array 306, BS panel arrays 306 may include any number of one or more BS panel antennas.

Each of the BS panel antennas 302 may include one or more antenna elements, as will be illustrated and discussed below in connection with FIG. 4. The antenna elements at the BS may produce one or more transmitter beams 310 (also termed as Tx beam). The Tx beams 310 may pass a physical cluster (e.g., a physical environment that the transmission beam 310 may pass through or bounce off of, such as buildings, objects, walls, etc.) to reach the UE panel antennas 304. Stated another way, the antenna elements may form directional beams 310 (e.g., the Tx beams) directed toward the location of the UE panel antennas 304 for reception of the directional beams (e.g., the Tx beams) at the UE panel antennas 304. Also, as discussed further below, each of the UE panel antennas 304 may include antenna elements that may produce a received beam (also termed as a Rx beam) for reception by the BS 308 at the antenna elements of the BS panel antennas 302.

Figure 4:
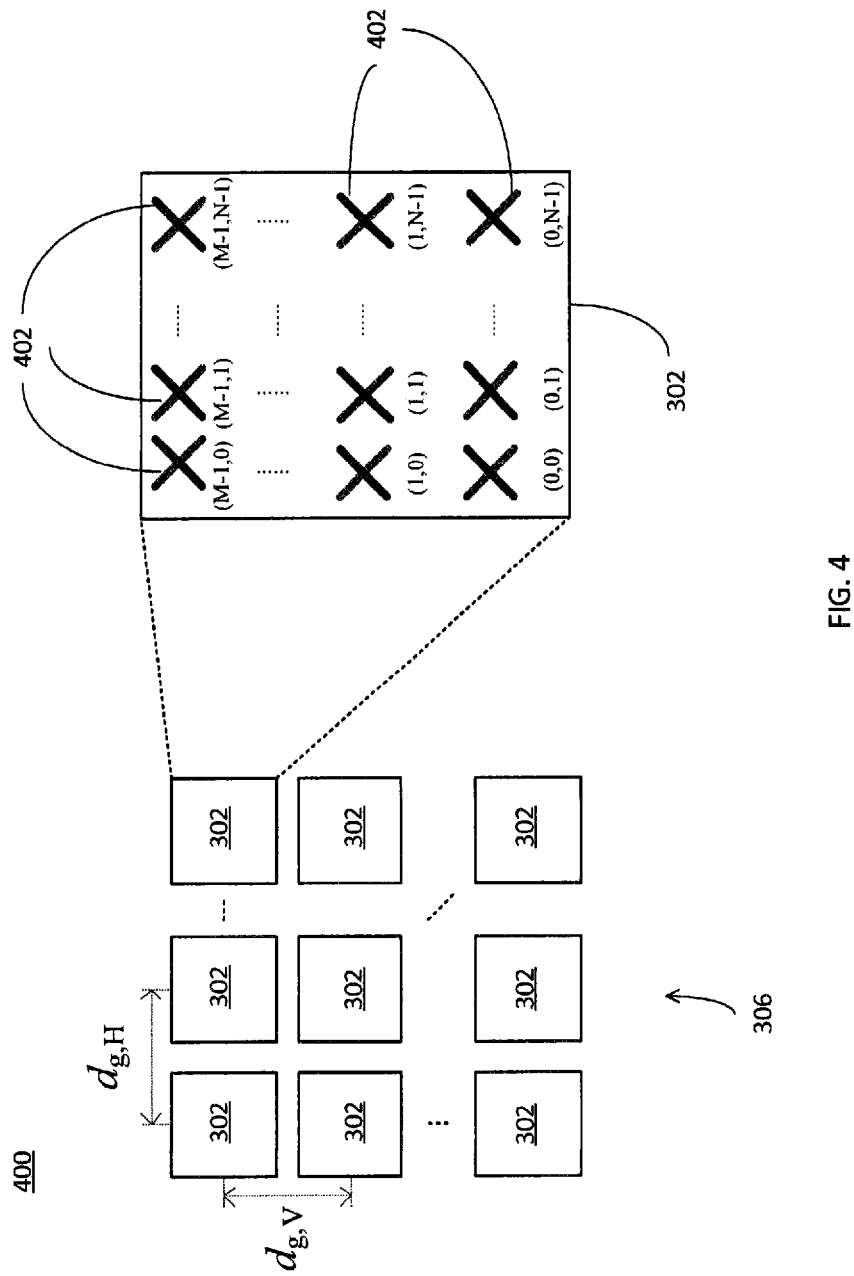
FIG. 4 illustrates a block diagram of antenna elements that may be arranged in the base station panel antennas of FIG. 3, in accordance with some embodiments.

FIG. 4 illustrates a block diagram 400 of antenna elements 402 that may be arranged in the base station panel antennas 302 of FIG. 3, in accordance with some embodiments. The collection of base station panel antennas 302 may be part of the base station panel array 306, as discussed above in connection with FIG. 3.

Returning to FIG. 4, the base station panel array 306 may be a rectangular panel array comprising $M_g N_g$ base station panel antennas 302 with $M_g$ being the number of base station panel antennas 302 in a column and $N_g$ being the number of base station panel antennas 302 in a row. Furthermore the base station panel antennas 302 may be uniformly spaced in the horizontal direction with a spacing of $d_{g,H}$ and in the vertical direction with a spacing of $d_{g,V}$. On each panel antenna, antenna elements 402 may be placed in a vertical direction and a horizontal direction, where N is the number of columns and M is the number of antenna elements with the same polarization in each column. Also, the numbering on the panel is based on observation of the antenna array from the front (with x-axis pointing towards broad-side and increasing y-coordinate for increasing column number). The base station panel antenna 302 may be either single polarized (P=1) or dual polarized (P=2).

As discussed above, typical determinations of RSRP may not provide sufficient granularity to provide meaningful information for beam reporting. For example, an RSRP may be determined at a UE based on received signals from a BS. However, the modulation, transmission, propagation, reception, and demodulation of beams from a BS to UE may be complex, with many moving parts. Accordingly, robust beam reporting with communication details that takes each of these complex moving parts into consideration may provide more meaningful information that beam reporting that does not take these complex moving parts into consideration.

For example, a UE may include multiple panel antennas for reception of beams from a BS. However, a same beam transmitted from the BS may be received differently by the UE depending on the orientation (e.g., polarization and/or direction an antenna is facing) of the UE's receiving panel antenna. Accordingly, beam reporting that does not take the UE panel antenna's orientation into consideration may not characterize a beam as well as robust beam reporting that does take the UE panel antenna's orientation into consideration.

As a further example, in the case of dual polarization, the two beams associated with different polarization but the same precoding from a BS may be characterized as different beams for the purposes of beam reporting. Stated another way, treating these beams as separate for beam reporting may produce a superior, or more accurate, channel estimation or RSRP determination than treating these beams the same.

However, in certain embodiments, accurate beam reporting may be balanced with practical considerations. For example, the performance gain by treating dual polarization beams as separate may not outweigh the savings in processing resources by treating dual polarization beams the same. This may be due, for example, to a miniscule accuracy gain due to separate treatment when the beams have very similar properties. Therefore, in certain embodiments, considerations of accurate beam reporting may be balanced with practical considerations such as performance gain versus resource cost for implementing certain types of beam reporting, as will be discussed further below (e.g., when determining a combined RSRP value).

FIGS. 5A, 5B, 5C, and 5D are simulation results that illustrate power variations across different beams with different polarizations, in accordance with some embodiments. These figures illustrate how changes in various beam reporting parameters, such as polarization of Tx beams, may yield a corresponding change in channel estimation results, such as RSRP and/or channel gain across different BS and UE configurations.

Figure 5A:
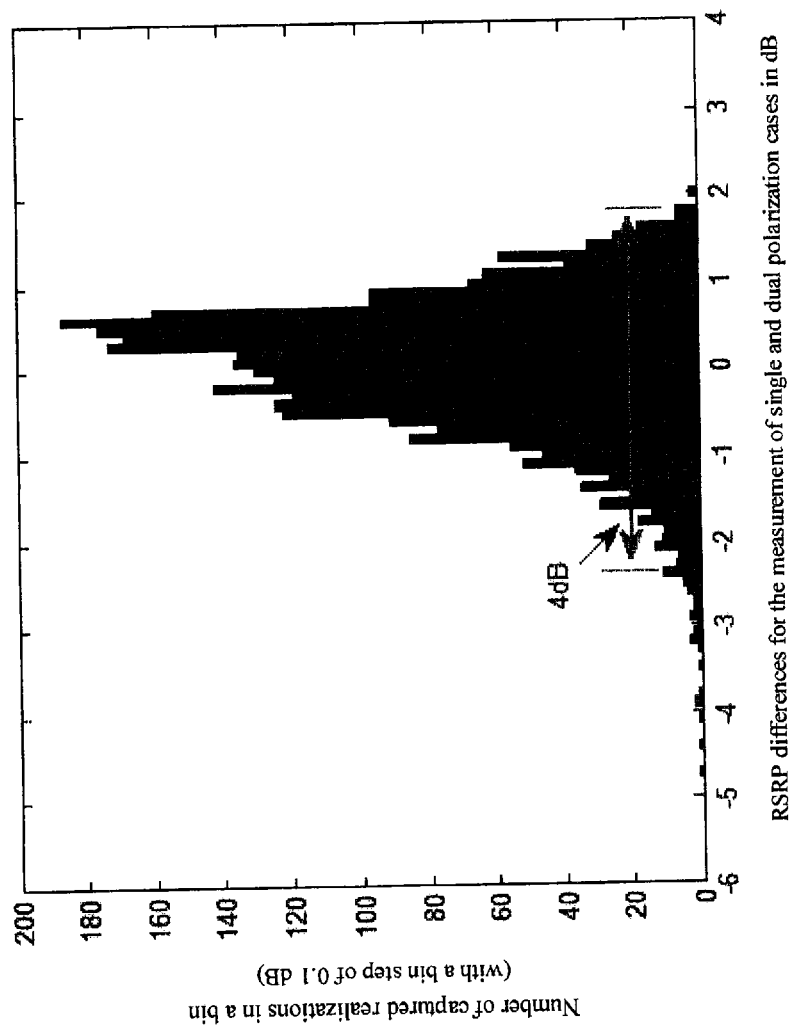
FIG. 5A, 5B, 5C, 5D are simulation results that illustrate power variations across different beams with different polarizations, in accordance with some embodiments.

For example, FIG. 5A illustrates how there may be a RSRP measurement error of 4-dB when a dual polarization Tx beam is evaluated in beam reporting as a single polarized Tx beam. FIG. 5A plots RSRP differences for the measurement of single and dual polarization cases in dB along the x axis and the number of captured realizations in a bin (with a bin step of 0.1 dB) along the y axis. The data in the plot was based on 3072 realization cases in a 30 GHz link level simulation (LLS) where a BS is represented by one panel of 8×4 antenna elements with dual polarization, and where the UE is represented by a panel antenna of 4×2 antenna elements with dual polarization.

Figure 5B:
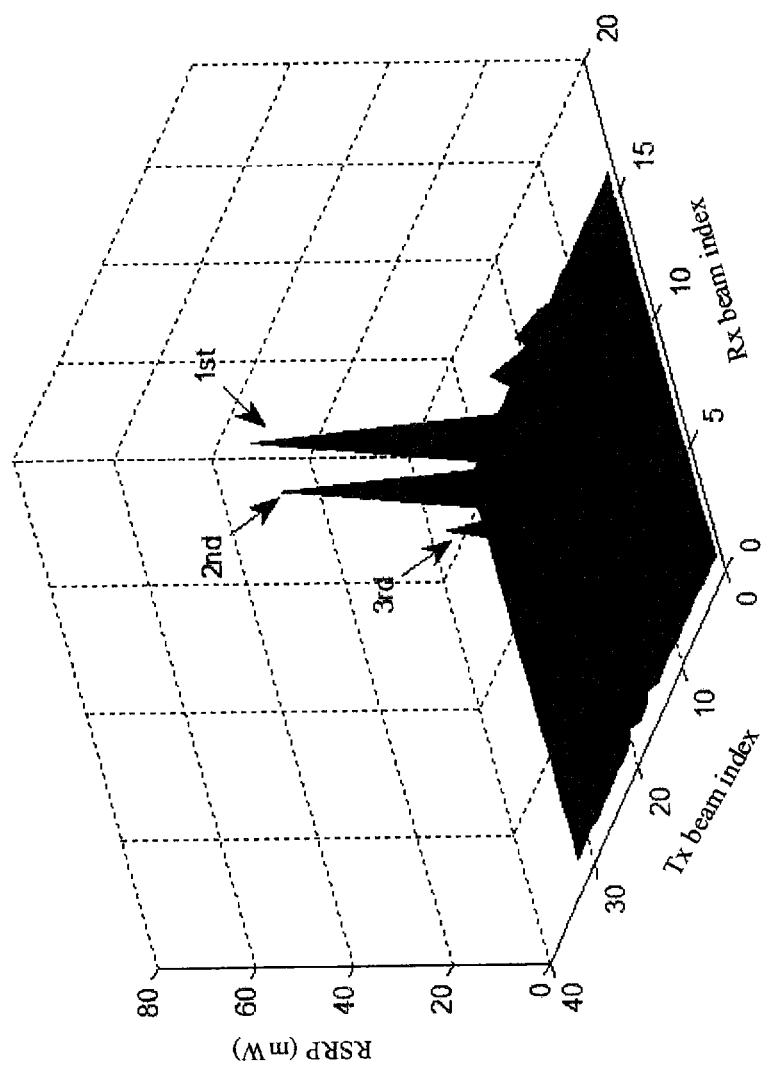
Figure 5C:
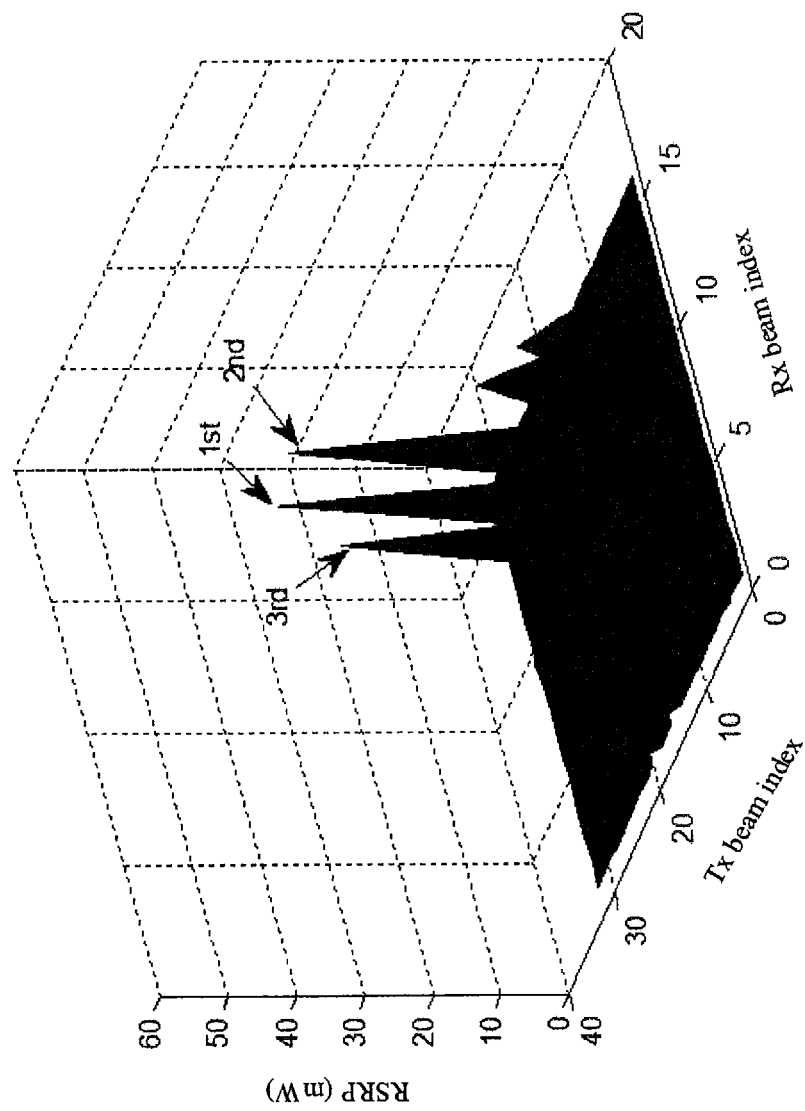
Figure 5D:
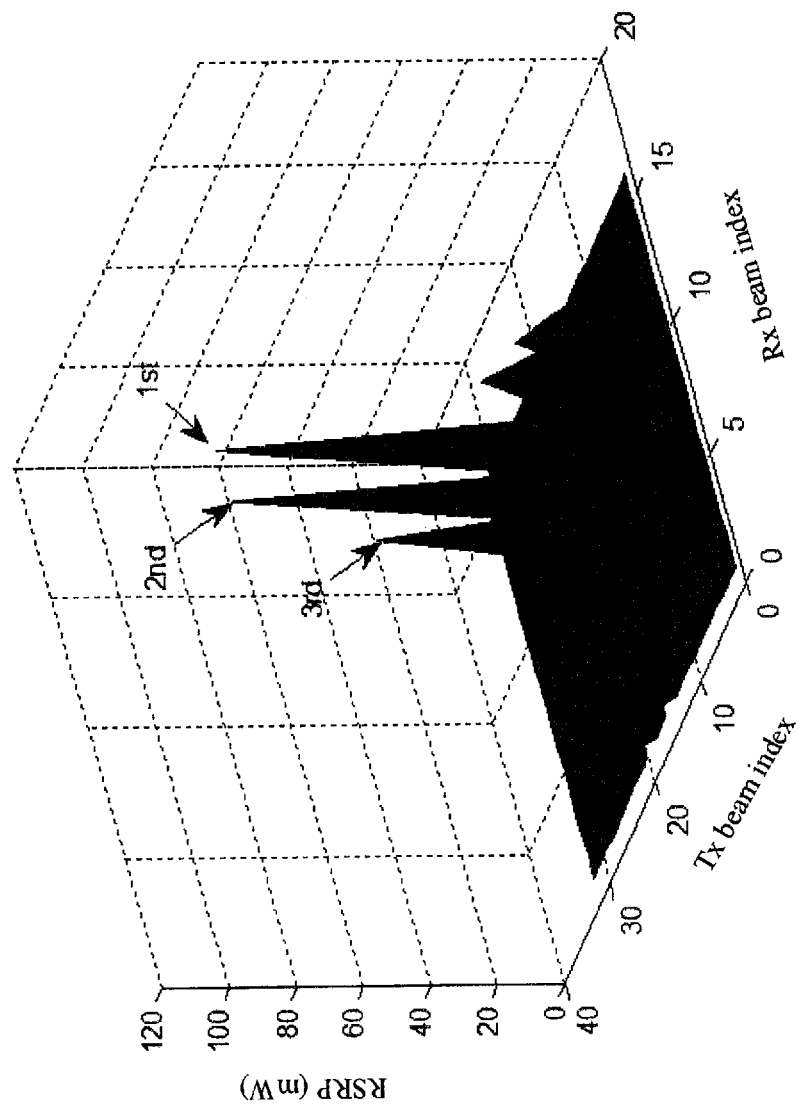

FIGS. 5B, 5C, and 5D illustrate further simulation results that indicate how different types of BS polarization may yield different simulation results. Specifically, FIG. 5B illustrates RSRP measurement results for a single antenna port at +45-degree BS polarization. FIG. 5C illustrates RSRP measurement results for a single antenna port at −45-degree BS polarization. FIG. 5D illustrates RSRP measurement results over two antenna ports for +/−45-degree BS polarization, respectively. Each of FIGS. 5B, 5C, and 5D, were simulated with SNR assumed to be at 0 dB with a receiver noise power of 1 mW. The markings of "$1^{st}$", "$2^{nd}$", and "$3^{rd}$" demarcate the first highest, second, highest, and third highest peaks, respectively. It can be noted that each of FIGS. 5B, 5C, and 5D are different. Therefore, FIGS. 5B, 5C, and 5D indicate how a change in polarization of beams transmitted at a base station will change the determinations of RSRP (and subsequent beam reporting and/or determination) at a UE.

In addition to the above embodiments, various exemplary embodiments will be discussed below that provide non limiting examples of robust beam reporting that takes various communication aspects, such as applicable multiplexing or diversity transmission schemes, into consideration to more accurately characterize beams relative to beam reporting that does not take these various communication aspects into consideration. Although six exemplary embodiments are described below, further exemplary embodiments may be contemplated in accordance with the embodiments described herein. Furthermore, each of the exemplary embodiments may include features of other exemplary embodiments, such as where a channel estimation report may include different parameter values discussed in different exemplary embodiments.

In accordance with various embodiments, robust beam reporting may include channel estimation and channel estimation reporting based upon the specifications of a UE. For example, RSRP determinations may be made on a per UE antenna group and/or a per Rx beam set basis. As discussed above, a UE may be configured differently than BSs and other UEs, such as by having different receiver panel antenna orientations, number of antennas, demodulation schemes, channel estimation report transmission schemes (e.g., time and/or formatting of channel estimation reports sent from a UE to a BS) and the like. Accordingly, for robust beam reporting, the practical, or relevant nuances of a UE may be taken into consideration when performing channel estimation. In accordance with various exemplary embodiments, methods and systems for robust beam reporting may include a plurality of beam reporting formats described below as Type-A, Type-B1, Type-B2, and Type-C formats. In accordance with various embodiments, a robust beam reporting protocol may include one or more, or all, of these beam reporting formats as selectable formats based on specified criteria.

As discussed above, RSRP determination may be a type of channel estimation based on RSs. Also, RSRP may be a type of parameter and an RSRP value may be a type of parameter value. Furthermore, a RSRP report (which may include RSRP values) may be a type of channel estimation report.

In accordance with some embodiments, Table 1 below shows a first beam reporting format wherein a RSRP Type A value may be determined for each Tx beam transmitted from a BS to a UE and evaluated by the UE on a per UE antenna group basis. Stated another way, a RSRP value is determined for each Tx beam (each having a logical beam index) received by a corresponding UE antenna group. In some embodiments, an antenna group may be a grouping of antennas (e.g., quasi co-located antennas), as dictated by similar characteristics (e.g., transmission and/or reception properties, etc.) between each constituent antenna of the antenna group. Quasi co-location will be discussed further below.

TABLE 1

Beam Reporting Format For UE Antenna Group

| | | |
|---|---|---|
| UE antenna group $ID_1$ | logical beam index$_{1,1}$ | RSRP Type-A, other parameters |
| | ... | |
| | logical beam index$_{1,y(1)}$ | RSRP Type-A, other parameters |
| | ... | |
| UE antenna group $ID_L$ | logical beam index$_{L,1}$ | RSRP Type-A, other parameters |
| | ... | |
| | logical beam index$_{L,y(L)}$ | RSRP Type-A, other parameters |

In Table 1 above, the UE antenna group ID identifies a group of UE antennas that are associated with each other (e.g., quasi-co-located, as discussed in further detail below), the logical beam index is an identifier for an individual Tx beam received by the UE from the BS (and may be represented by a port index, port group index, a CSI-RS resource indicator, a combination of the above (e.g., a port index, a port group index, a CSI-RS resource indicator) and the like), and the RSRP Type-A parameter represents a measured RSRP value for each Tx beam received by the UE and grouped with a corresponding UE antenna group. As shown in Table 1, in addition to the RSRP Type A parameter, other information such as other parameters about CSI, may be included in the beam reporting format. As further shown in Table 1, each UE antenna group may receive a plurality of Tx beams, and the beam reporting format may include information about a plurality of UE antenna groups. In accordance with various embodiments, a beam report may include some or all of the measured RSRP Type A values for all Tx beams for all UE antenna groups, or any subset of this information based on desired criteria or applications. The subscripts next to UE antenna group ID and logical beam index are arbitrary and merely represent that there may be multiple UE antenna group IDs and multiple logical beam indexes in a beam report, in accordance with various embodiments of the invention.

In accordance with some embodiments, Table 2 below shows a second beam reporting format in which a Type-B1 RSRP parameter may be determined on a per Tx beam basis as evaluated at the UE on a per "Rx beam set" basis. Stated another way, an RSRP parameter may be determined for each Tx beam received by the UE and grouped in a corresponding "Rx beam set" of the UE. For example, RSRP values for a plurality of Tx beams transmitted to the UE may be determined and thereafter grouped as corresponding to a single Rx beam set of the UE. In accordance with various embodiments, a beam set may include a plurality of beams that share one or more common features or characteristics (e.g., quasi-co-located beams, as discussed further below).

TABLE 2

Beam Reporting Format Based on Per Reported Tx Beam per Rx Beam Set

| Rx beam set $ID_1$ | logical beam index$_{1,1}$ | RSRP Type-B1, other parameters |
|---|---|---|
| | ... | ... |
| | logical beam index$_{1,y(1)}$ | RSRP Type-B1, other parameters |
| | ... | |
| Rx beam set $ID_L$ | logical beam index$_{L,1}$ | RSRP Type-B1, other parameters |
| | ... | ... |
| | logical beam index$_{L,y(L)}$ | RSRP Type-B1, other parameters |

In Table 2 above, the Rx beam set ID identifies a group of Rx beams that are associated with each other, the logical beam index is an identifier for an individual Tx beam received by the UE from the BS (and may be represented by a port index; port group index; a CSI-RS resource indicator; a combination of a port index, a port group index, and a CSI-RS resource indicator; and the like), and the Type-B1 RSRP parameter represents a measured RSRP value for a corresponding Tx beam received by the UE and grouped with a corresponding Rx beam set. As shown in Table 2, in addition to the RSRP Type B1 parameter, other information such as other parameters about CSI, may be included in the beam reporting format. As further shown in Table 2, each Rx beam set may correspond to a plurality of Tx beams, and the beam reporting format may include information about a plurality of Rx beam sets. In accordance with various embodiments, a beam report may include some or all of the measured RSRP Type B2 values for all Tx beams for all Rx beam sets, or any subset of this information based on desired criteria or applications. The subscripts next to Rx beam set ID and logical beam index are arbitrary and represent that there may be multiple Rx beam set IDs and multiple logical beam indexes in a RSRP report.

In accordance with some embodiments, a third beam reporting format is shown in Table 3 below in which a Type-B2 RSRP may be determined for all Tx beams corresponding to a Rx beam set. Stated another way, a single RSRP value may be determined for multiple Tx beams belonging to a predetermined Rx beam group. For example, RSRPs for all Tx beams that are transmitted to the UE and belonging to a single Rx beam set may be determined and thereafter used to calculate an aggregate RSRP Type-B2 value. Accordingly, each Rx beam set (which may include information on multiple Tx beams) will have a single RSRP Type-B2 parameter value), in contrast with the Type B1 embodiments that may have multiple RSRP parameter values per Rx beam set, as discussed above.

TABLE 3

Beam Reporting Format Based on All Reported Tx Beam per Rx Beam Set

| Rx beam set $ID_1$ | logical beam index$_{1,1}$ | Type-B2 parameter (e.g., RSRP) |
|---|---|---|
| | ... | |
| | logical beam index$_{1,y(1)}$ | |
| | ... | |
| Rx beam set $ID_L$ | logical beam index$_{L,1}$ | Type-B2 parameter (e.g., RSRP) |
| | ... | |
| | logical beam index$_{L,y(L)}$ | |

In Table 3 above, the Rx beam set identifies a group of Rx beams, the logical beam index is an identifier for an individual beam received by the UE from the BS (and may be represented by a port index; port group index; a CSI-RS resource indicator; a combination of a port index, port group index, and a CSI-RS resource indicator; and the like), and the RSRP Type-B2 parameter represents a value of an aggregate RSRP value measured for a plurality of Tx beams belonging to a single Rx beam set. In some embodiments, the RSRP Type-B2 value may be calculated as an average of multiple measured RSRP values, or as a sum of multiple measured RSRP values, or as a predetermined weighted function of the multiple measured RSRP values, for example. As shown in Table 3, in addition to the RSRP Type B2 parameter, other information such as other parameters about CSI, for example, may be included in the beam reporting format. As further shown in Table 3, each Rx beam set may correspond to a plurality of Tx beams but only one RSRP Type-B2 value, and the beam reporting format may include information about a plurality of Rx beam sets. In accordance with various embodiments, a beam report may include some or all of the measured RSRP Type B2 values for all Rx beam sets, or any subset of this information based on desired criteria or applications. The subscripts next to Rx beam set ID and logical beam index are arbitrary and represent that there may be multiple Rx beam set IDs and multiple logical beam indexes in a RSRP report.

In accordance with further embodiments, Table 4 illustrates another beam reporting format in which Type-C RSRP parameter is determined for each of a plurality of Tx beams grouped into a corresponding UE antenna group. A plurality of UE antenna groups may further be grouped into a corresponding Rx beam set group. Stated another way, an RSRP may be determined for all Tx beams and be organized per UE antenna group and per Rx beam set, where a Rx beam set may include multiple UE antenna groups, and a UE antenna group may include multiple Tx beams. Alternatively, in some embodiments, an RSRP may be determined for all Tx beams and be organized per Rx beam set and per UE antenna group, where a UE antenna group may include multiple Rx beam sets, and a Rx beam set may include multiple Tx beams. In other words, the hierarchy of the UE antenna groups and Rx beam sets may be switched in Table 4 to provide a new class of RSRP parameter (e.g., a RSRP Type-D).

TABLE 4

Beam Reporting Format Per Reported Tx Beam Per UE Antenna Group Per Rx Beam Set

| Rx beam set | UE antenna group | logical beam index | Type |
|---|---|---|---|
| $ID_1$ | group $ID_{1,1}$ | logical beam index$_{1,1,1}$ | Type-C parameter (e.g., RSRP) |
| | | ... | |
| | | logical beam index$_{1,1,y(1,1)}$ | Type-C parameter (e.g., RSRP) |
| | | ... | |
| | UE antenna group $ID_{1,x(1)}$ | logical beam index$_{1,x(1),1}$ | Type-C parameter (e.g., RSRP) |
| | | ... | |
| | | logical beam index$_{1,x(1),y(1,x(1))}$ | Type-C parameter (e.g., RSRP) |
| | | ... | |
| Rx beam set $ID_L$ | UE antenna group $ID_{L,1}$ | logical beam index$_{L,1,1}$ | Type-C parameter (e.g., RSRP) |
| | | ... | |
| | | logical beam index$_{L,1,y(L,1)}$ | Type-C parameter (e.g., RSRP) |
| | | ... | |
| | UE antenna group $ID_{L,x(L)}$ | logical beam index$_{L,x(L),1}$ | Type-C parameter (e.g., RSRP) |
| | | ... | |
| | | logical beam index$_{L,x(L),y(L,x(L))}$ | Type-C parameter (e.g., RSRP) |

The Rx beam set group, UE antenna group, logical beam index representing each Tx beam are similar to the similarly named groups discussed above. As shown in Table 4, however, the beam reporting format organizes these groups in a new hierarchy and generates RSRP Type-C parameter values in accordance with this hierarchy. As shown in Table 3, in addition to the RSRP Type B2 parameter, other information such as other parameters about CSI, for example, may be included in the beam reporting format. As further shown in Table 4, each Rx beam set may correspond to a plurality of UE antenna groups, and each UE antenna group can correspond to a plurality of Tx beams and a corresponding number of RSRP Type-C parameter values, and the beam reporting format may include information about a plurality of Rx beam set groups. In accordance with various embodiments, a beam report may include some or all of the measured RSRP Type-C values for all Rx beam sets, or any subset of this information based on desired criteria or applications.

In certain embodiments, as introduced above, parameters in each individual report (e.g., channel estimation report or RSRP report) may combine multiple individual parameter values (e.g., individual RSRPs) from multiple RSs (from multiple beams) to form a combined parameter value used to represent each of the multiple RSs (and/or each of the multiple beams). A combined RSRP value may be a type of combined parameter value. Stated another way, a RSRP value may be equivalent to summation of RSRPs of all of individual combination branches. The Type-B2 embodiments, discussed above, provides an example of a combined parameter value where each Rx beam set (which may include information on multiple Tx beams) may have a single parameter (e.g., a single combined parameter value), in contrast with other embodiments that may have multiple parameters per Rx beam set. In particular embodiments, these combined parameter values may be a sum of the RSRP values, a linear average of RSRP values, or a maximum value of any of the individual constituent RSRP values. Each of the RSRP values may be determined based upon resource element (RE) on which the RS (e.g., the CSI-RS) is transmitted as part of a beam. Stated another way, each of the RSRP values may be determined in accordance with an individual diversity branch. In certain embodiments, the combined parameter values may be set so that it is never lower than a constituent RSRP value (e.g., an RSRP value from which the combined parameter value is determined).

Furthermore, the manner of robust beam reporting may determine how a channel estimation parameter (e.g., RSRP) is determined. Stated another way, formatting or a data structure of a channel estimation report (e.g., RSRP report) may dictate how channel estimation is performed, and vice versa. This may at least be due to a channel estimation report dictating the type of information (e.g., parameters) to be transmitted together (and thus dictating the parameters that may be determined substantially together or prior to being transmitted together). For example, as discussed above, in Type-A embodiments, RSRP values may be determined at receipt and be based on the receiving antenna of a UE (e.g., be evaluated based on the signals received at a UE antenna group). Also, in Type-B1 embodiments, RSRP values that are to be transmitted together (in a Rx beam or a Rx beam set) may be determined together and/or at substantially the same time. Also, in Type-B2 embodiments, RSRP values for all beams that are to be transmitted together (in a Rx beam or a Rx beam set) may be determined together and/or at substantially the same time.

In accordance with further exemplary embodiments, robust beam reporting may be performed with channel estimation (e.g., RSRP determinations) based upon BS port groups. These RSRP determinations may be determined at the UE as instructed by the BS or as selected by the UE. The UE may select how it may determine RSRP based upon selection criteria (e.g., available resources, such as what RSs are detected or the amount of computing resources available to the UE), as will be discussed further below. Also, a BS may instruct the UE to determine RSRP on a per port group basis (where the number of ports within one port group is K, and K is positive integer). For example, if K=1, RSRP may be measured per one BS port. The instructions that the BS may provide to the UE may also be based upon selection criteria (e.g., available resources, such as what RSs are included in beams for reception by the UE or the amount of computing resources available to the UE). Relating RSRP to broader concepts discussed above, the instructions that the BS may provide to the UE may indicate a type of channel estimation protocol.

In certain embodiments, the UE may determine RSRP based upon a RS port group. Stated another way, the UE may determine RSRP based upon BS port groups identified to the UE from the BS. These BS port groups may also correspond to particular RSs. In certain embodiments, ports that are part of a single port group may transmit their RSs simultaneously. The UE may perform this determination as instructed by a BS or locally, based upon selection criteria, as discussed above.

Figure 6:
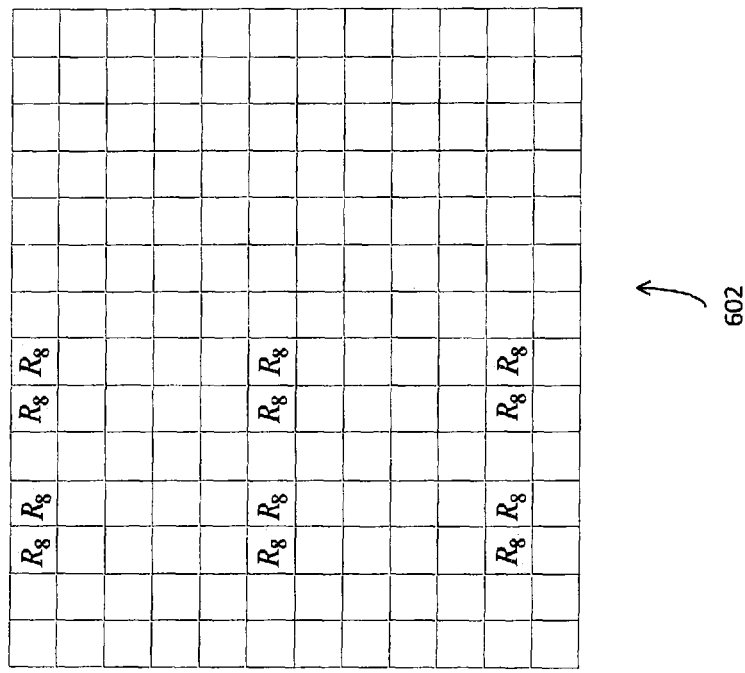
FIG. 6 illustrates two resource grids with correlations between different resource elements in the two resource grids, in accordance with some embodiments.
Figure 6:
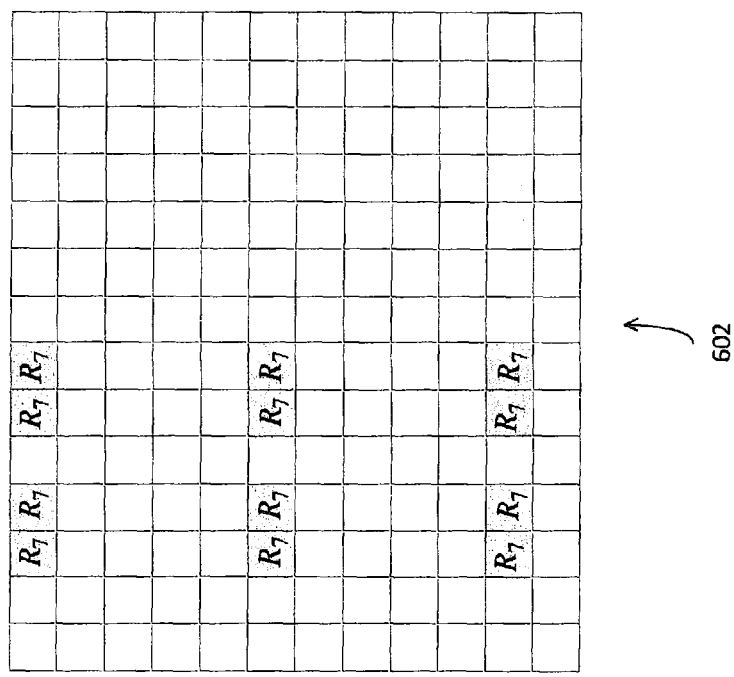

Examples of the types of BS port groups that the UE may determine RSRP for are given below. As a first example, RSRP may be determined per set of time division code division multiplexing (TD-CDM) ports and/or frequency domain code division multiplexing (FD-CDM) ports. These types of ports (which may be part of a port group) is illustrated in FIG. 6, which illustrates resource grids 602 where frequency is represented on the y axis and plotted against time on the x axis. As illustrated in FIG. 7, R7 and R8 each represent a single port group sharing FD-CDM properties transmitted at different intervals of time (arbitrarily chosen as a $7^{th}$ interval of time and an $8^{th}$ interval of time). Also, when the number of ports is 1 in a port group, RSRP may be based on one port.

As a second example, RSRP may be determined per set of time division orthogonal cover code (TD-OCC) ports and/or frequency division orthogonal cover code (FD-OCC) ports. As a third example, RSRP may be determined for all ports within one component, which may be determined based upon selection criteria, as introduced above. A component may be one set of time and frequency resources (e.g., a resource element) kept consecutive in both a time and frequency domain. As a fourth example, RSRP may be determined for all ports within one orthogonal frequency division multiplexing (OFDM) symbol or sub-unit. As a fifth example, RSRP may be determined per K ports of one RS resource (e.g., a CSI-RS resource, antenna ports, RS patterns, portions of time and frequency associated with a resource element, etc.) in order, where K is an arbitrary number that would be indicated to a UE from a BS. As a sixth example, RSRP may be determined per RS resource or set of RS resources (e.g., resource group), such as a CSI-RS resource or set of CSI-RS resources. In certain embodiments, each RS port group may be identified in accordance with the RS resource or set of RS resources.

As a seventh example, RSRP may be determined per set of ports sharing the same or similar channel properties. Stated another way, RSRP may be determined per set of ports that are quasi colocated (QCL). Being QCL indicates that these sets of ports may share the same or similar channel properties. Channel properties for determining whether two or more resources should be QCLed can include one or more of the following properties: (1) Doppler spread; (2) Doppler shift; (3) delay spread; (4) average delay; (5) average gain; and (6) Spatial parameter. As used herein, "Doppler spread" refers to the frequency-domain spread for one received multipath component, "Doppler shift" refers to the frequency difference between one carrier component observed by a receiver and that transmitted by a transmitter in terms of carrier frequency, "delay spread" refers to the time difference between the arrival moment of a first received multipath component (typically the line of sight (LOS) component) and the last received multipath component (typically a non-line of sigh (NLOS) component), "average delay" refers to weighed average of delay of all multipath components multiplied by a power of each components, "average gain" refers to an average transmission power per antenna port or resource element, and "Spatial parameter" refers to spatial-domain properties of multipath components observed by a receiver, such as angle of arrival (AoA), spatial correlation, etc. This information of channel properties can be pre-defined or configured by L−1 or higher level signaling. For example, it can be predefined that two channel properties are similar to each other when their respective parameter values are within 5% or 10% of each other. In certain embodiments, ports that are QCLed may share similar channel properties while a broader concept of an port group may include any cluster of ports, which may or may not share similar channel properties (and that may be arbitrarily clustered).

In certain embodiments, more than one type of RS may be utilized for RSRP determination to produce a combined RSRP value. When more than one type of RS is utilized for RSRP determination, a final RSRP (e.g., combined RSRP) associated with the RS may be based on weighted RSRP values from different RSs. For example, individual RSRPs from different RSs may be weighted (e.g., prioritized) differently as instructed from a BS, predetermined, or based on selection criteria. For example, RSRPs from a demodulation reference signal (DMRS) of a physical broadcast channel (PBCH) may be afforded more weight when determining a combined RSRP value (e.g., a combined parameter value) than from a channel state information reference signal (CSI-RS) and/or a synchronization signal (SS) (as a RS).

In certain embodiments, two types of RSs may have the same time/frequency in certain regions (e.g., subcarriers or physical resource blocks (PRB)), but have differences in other regions. In these embodiments, weights may be afforded to RSs for combined parameter value determinations (e.g., a combined RSRP value) that may be based on parameters (e.g., RSRPs) present (and/or with qualities present) in certain regions (but not other regions). For example, a lower weight (e.g., 50%) may be applied for combined parameter value determination in regions where two types of RSs may have the same time/frequency. However, a higher weight (or full weight, e.g., 100%) may be applied at other regions where the two types of RSs may not have the same time/frequency and where only one RS is utilized for RSRP determination.

In particular embodiments where multiple RSs are used for a combined parameter value determination, the weight value for a RS with a wider band may be greater than that of a RS with a narrower band. As an example when a CSI-RS and an SS are used as RS, the CSI-RS that is applicable for a whole band may be weighted at more than 50%, while the SS that is only applicable for a partial band may be weighted at less than 50%.

Also, combined parameter value determinations may follow pre-defined rules to distinguish between RSs for use in parameter value determinations in a situation where multiple RSs may be used for parameter value determinations. For example, a predefined rule may instruct a UE to determine RSRP during radio resource management (RRM) if a CSI-RS is detected. However, if a CSI-RS is not detected, the SS block may be utilized as the RS for RSRP determination.

In accordance with further exemplary embodiments, robust beam reporting may include providing Tx transmission properties (e.g., specification information) to a UE. Specifically, a BS may send a port group indicator that includes transmission properties or specification information from which the BS, in response to receiving the port group indicator, may perform channel estimation (in accordance with a particular channel estimation protocol) and return a channel estimation report (in accordance with the particular channel estimation protocol). Accordingly, the port group indicator may be a type of instruction to perform a particular channel estimation protocol.

The port group indicator may indicate a predetermined grouping of BS ports (e.g., a BS port group) that may be referenced by the UE when determining RSRP. For example, upon being instructed for which BS port group may be associated with which reference signals or beams, the UE may produce a report structured in a manner that indicates a correspondence between the RSRP value and the identified BS port groups.

In certain embodiments, a port group indicator may be a CSI-RS resource indicator transmitted from the BS to a UE. These BS port groups may be notated with an index expressed as SET-i, where "i" indicates a port group number or index. In particular embodiments, the BS ports within each BS port group number may be related a single panel antenna. This BS port group number, that identifies a BS port group, may be transmitted to a UE so that the UE can reference the BS port group number when determining RSRP or formatting a channel estimation report.

In certain embodiments, a port group indicator may indicate a maximum number (e.g., as arbitrary number $S_i$) of BS ports that may transmit simultaneously within any particular BS port group (e.g., within any "SET-i").

In certain embodiments, a port group indicator may indicate a total number of BS ports within a BS port group. For example, the port group indicator may indicate a total number of BS ports (e.g., as arbitrary constant $S_i$) that may be grouped, or QCLed, with other BS ports to make a BS port group (e.g., a SET-i).

In certain embodiments, a port group indicator may indicate a maximum of layers (e.g., independent data streams) that may be associated with a particular BS port group. Stated another way, a port group indicator may indicate that a total number of layers whose DMRS is QCLed with any one of port/port group of a BS within a particular SET-i is no more than $S_i$ (an arbitrary constant value).

In certain embodiments, a port group indicator may indicate a maximum number of independent data streams (e.g., layers or ranks) that may be utilized in a data/control channel that is associated with any BS port group. Stated another way, a port group indicator can indicate that a maximum number of independent data streams for a data/control channel whose DMRS ports are (spatial) QCLed with any BS port or BS port group within a particular SET-i is no more than $S_i$ (an arbitrary constant value).

In addition to a port group indicator providing information concerning BS ports or port groups at a BS, a port group indicator may also provide information concerning how a UE is to produce a report for transmission to a BS. For example, in certain embodiments, a port group indicator may indicate, for a RX beam set, that a maximum number of Tx beams from a BS port group (e.g., SET-i) within the same Rx beam set may be no more than $S_i$ or $S_i/a$ (where a is positive integer, such as 2, as based on capabilities of a TXRU of a BS). In further embodiments, a port group indicator may indicate that the maximum number of Tx beams from a SET-i within the same Rx beam set but different UE antenna groups should not be more than $S_i$ (an arbitrary constant value) or $S_i/a$ (where a is positive integer, such as 2, as based on capabilities of a TXRU of a BS).

In accordance with some exemplary embodiments, robust beam reporting may include a UE sending a channel estimation report that indicates a number of independent data streams that the UE may support (e.g., the UE's capabilities). This type of channel estimation report may be termed as a capability report, and be transmitted as instructed by a BS or may be transmitted independent of input from a BS, such as being transmitted as a beacon that may be sent periodically.

For example, the UE may send a capability report to a BS that details the number of independent data streams that may be associated with each Tx beam, Tx beam set, Rx beam, or Rx beam set. As a further example, a UE may generate and send a capability report for the maximum number of independent data streams (e.g., ranks or layers) that may be associated with particular Tx beams, Tx beam sets, ports (at either the BS or UE), contention resolution identities (CRIs), CRI(s)+port(s) (at either the BS or UE), port group(s) (at either the BS or UE), Rx beams, or Rx beam sets.

As another example, a capability report may indicate that there may be no more than $R_i$ (e.g., 2) independent data streams (e.g., layers) for DMRS antenna ports that are part of a particular BS port group (e.g., a BS port group of BS ports spatially QCLed with a particular port-i, port group-i or Rx beam set-i). As yet another example, a capability report may indicate a maximum number of independent data streams for a data/control channel for a particular BS port or BS port group. Stated another way, a capability report may indicate a maximum number of independent data streams (e.g., maximal rank or layers) for a data/control channel whose DMRS ports are (spatial) QCLed as a port group.

In accordance with fifth exemplary embodiments, robust beam reporting may provide specific definitions for RSRP, which may be referred to herein as a customized RSRP definition. These customized RSRP definitions may be associated with particular ports or port groups.

In certain embodiments, a customized RSRP definition may include a co-phase based customized RSRP definition. The co-phase based customized RSRP definition may be that a RSRP is defined as the maximal value of a linear average over the power contributions (in [W]) of received resource elements, which carry a RS within a particular measurement frequency bandwidth, and that are associated with antenna ports weighted by selective co-phase elements associated with the antenna ports, respectively, where co-phase elements are from a predefined set. The predefined set may be obtained from a discrete Fourier transform DFT with oversampling.

In certain embodiments, a customized RSRP definition may include a maximal (or minimal) value based customized RSRP definition. The maximal (or minimal) value based customized RSRP definition may define RSRP as the maximal (or minimal) value of linear averages over the power contributions (in [W]) of received resource elements which carry a RS within a considered measurement frequency bandwidth and that are associated with any one of measured antenna ports In certain embodiments, a customized RSRP definition may include an average based customized RSRP definition. The average based customized RSRP definition may define RSRP as the linear average over the power contributions (in [W]) of resource elements which carry RSs within the considered measurement frequency bandwidth and that are associated with measured antenna ports.

In certain embodiments, a customized RSRP definition may include a single port customized RSRP definition, which may be utilized for a single antenna port. The single port customized RSRP definition may define RSRP as the linear average over the power contributions (in [W]) of resource elements that carry an RS within the considered measurement frequency bandwidth.

In accordance with yet another exemplary embodiment, robust beam reporting may include a partial bandwidth instruction. The partial bandwidth instruction may be transmitted from a BS to a UE, determined by UE behavior or pre-defined. The partial bandwidth instruction may instruct the UE to adopt a channel estimation protocol that performs channel estimation by determining a parameter (e.g., RSRP) from an entire RS's bandwidth or only part of an RS's bandwidth (e.g., 1/T of an RS's whole bandwidth, where the partial bandwidth instruction would provide the arbitrary constant "T").

For example, a partial bandwidth instruction may indicate a partial band RS that a UE is to utilize for channel estimation (e.g., RSRP determination). In response, the UE may produce a channel estimation report to the BS that indicates a band ID (identification of a bandwidth) and a RSRP value per partial band or for a portion of the partial bands (e.g., partial bandwidth). In further embodiments, a partial bandwidth instructions sent from a BS to a UE may instruct a UE to produce a channel estimation report to the BS of RSRP for a whole band, RSRP for a partial band, RSRP for a sub band, best-W RSRP from partial bands, where W is positive integer, or to indicate a band with the greatest RSRP value. A partial band may be part of a whole band. However, an aggregate of all reported partial bands do not need to compose (e.g., be equivalent to, or equal) a whole band. A sub band may be part of a whole band. However, an aggregate of all reported sub bands should compose (e.g., be equivalent to, or equal) the whole band. Each resource group (e.g. a beam set, an antenna group, a port, reference signal, a diversity branch, and a receive branch) may correspond to a different best partial band or frequency resource. The reported RSRP for different sub bands or partial bands can be grouped into different RSRP groups. An RSRP value for a whole band may be determined as a linear average over the sub bands related to different resource groups. For instance, a whole band may be divided into multiple sub bands and, in different sub bands, associated UE antenna group for RSRP determination across the whole band may be different (e.g., selected with the objective of maximizing RSRP of the sub bands). Accordingly, in certain embodiments, RSRP for the whole band may then be determined by a linear average over the RSRP for any of the sub bands. In certain embodiments, in an RSRP report, a derivation rule for a reported RSRP value from T RSRP values, where T is positive integer, from a set of resource groups may be: configurable by a BS; or indicated (e.g., recommended) to the BS by a UE; or determined based on a reception method at the UE. The derivation rule may include at least include one of the following rules: that the reported RSRP value is not lower than the T RSRP values; (b) that the reported RSRP value is a maximum RSRP value of E RSRP values; (c) that the reported RSRP value is a minimum RSRP value of E RSRP values; and (d) that the reported RSRP value is an average RSRP value of E RSRP values; where the E RSRP values are selected out of the T RSRP values and E is equal to or less than (e.g., <=T. Also, the reception method (e.g., technique) at the UE may include at least one of the following reception techniques: (a) reception by using one resource group; (b) reception by using multiple resource groups; (c) receive diversity; (d) receive combining in phase (e.g., combining received signals in accordance with phase); (e) receive combining in amplitude (e.g., combining received signals in accordance with amplitude); (f) receive filtering (e.g., filtering out certain received signals based upon criteria); and (g) spatial multiplexing.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a first communication node, comprising:
   receiving at least one reference signal from a second communication node;
   determining at least one reference signal received power (RSRP) value associated with the at least one reference signal;
   generating a RSRP report comprising the at least one RSRP value in accordance with a predetermined format,
   wherein the predetermined format is selected from at least three different reporting formats each of which corresponds to a respective manner of determining the at least one RSRP value, the at least three different reporting formats comprising:
      a first reporting format wherein the at least one RSRP value is determined for each transmitter beam transmitted from the second communication node to the first communication node;
      a second reporting format wherein the at least one RSRP value is determined on a per transmitter beam basis as evaluated at the first communication node on a per receiver set basis; and
      a third reporting format wherein the at least one RSRP value is determined for all transmitter beams corresponding to a receiver beam set at the first communication node,
   wherein one of the at least one RSRP value is associated with a resource group that comprises: a received beam set, a port group, and a reference signal (RS) resource,
   wherein the port group is a cluster of ports at the second communication node that is indicated by the second communication node by an explicit signal; and
   transmitting the RSRP report to the second communication node.

2. The method of claim 1, wherein the resource group further comprises at least one of: an antenna group, a RS resource set, a diversity branch, or a receive branch.

3. The method of claim 1, further comprising generating an additional RSRP report comprising one or more RSRP values based on one of the following hierarchical associations:
   each of the one or more RSRP values is determined for one beam transmitted from the second communication node and for one antenna group associated with the first communication node; or
   each of the one or more RSRP values is determined for one beam transmitted from the second communication node and for one antenna group associated with the first communication node and for one received beam set associated with the first communication node.

4. The method of claim 1, wherein:
   the at least one RSRP value is grouped into N sets of RSRP values;
   each of the N sets of RSRP values is associated with a respective one of N sets of resource groups;
   each of the N sets of resource groups contains at least one resource group; and
   N is a positive integer.

5. A method performed by a first communication node, comprising:
   sending at least one reference signal to a second communication node; and
   receiving, from the second communication node, a reference signal received power (RSRP) report comprising at least one RSRP value associated with the at least one reference signal,
   wherein the RSRP report is formatted in accordance with a predetermined format,
   wherein the predetermined format is selected from at least three different reporting formats each of which corresponds to a respective manner of determining the at least one RSRP value, the at least three different reporting formats comprising:
      a first reporting format wherein the at least one RSRP value is determined for each transmitter beam transmitted from the second communication node to the first communication node;
      a second reporting format wherein the at least one RSRP value is determined on a per transmitter beam basis as evaluated at the first communication node on a per receiver set basis; and
      a third reporting format wherein the at least one RSRP value is determined for all transmitter beams corresponding to a receiver beam set at the first communication node, wherein one of the at least one RSRP value is associated with a resource group that comprises: a received beam set, a port group, and a reference signal (RS) resource, and wherein the port group is a cluster of ports at the first communication node that is indicated to the second communication node by an explicit signal.

6. The method of claim 5, wherein the resource group further comprises at least one of: an antenna group, a RS resource set, a diversity branch, or a receive branch.

7. The method of claim 5, further comprising receiving an additional RSRP report, comprising one or more RSRP values, which is generated based on one of the following hierarchical associations:

each of the one or more RSRP values is determined for one beam transmitted from the first communication node and for one antenna group associated with the second communication node; or each of the one or more RSRP values is determined for one beam transmitted from the first communication node and for one antenna group associated with the second communication node and for one received beam set associated with the second communication node.

8. The method of claim 5, wherein:

the at least one RSRP value is grouped into N sets of RSRP values;

each of the N sets of RSRP values is associated with a respective one of N sets of resource groups;

each of the N sets of resource groups contains at least one resource group; and

N is a positive integer.

9. A first communication node comprising a processor and a memory, wherein the memory stores at least one instruction that, when executed, causes the processor to:

receive at least one reference signal from a second communication node;

determine at least one reference signal received power (RSRP) value associated with the at least one reference signal;

generate a RSRP report comprising the at least one RSRP value in accordance with a predetermined format, wherein the predetermined format is selected from at least three different reporting formats each of which corresponds to a respective manner of determining the at least one RSRP value, the at least three different reporting formats comprising:

a first reporting format wherein the at least one RSRP value is determined for each transmitter beam transmitted from the second communication node to the first communication node;

a second reporting format wherein the at least one RSRP value is determined on a per transmitter beam basis as evaluated at the first communication node on a per receiver set basis; and a third reporting format wherein the at least one RSRP value is determined for all transmitter beams corresponding to a receiver beam set at the first communication node, wherein one of the at least one RSRP value is associated with a resource group that comprises: a received beam set, a port group, and a reference signal (RS) resource, wherein the port group is a cluster of ports at the second communication node that is indicated by the second communication node by an explicit signal; and transmit the RSRP report to the second communication node.

10. The first communication node of claim 9, wherein the resource group further comprises at least one of: an antenna group, a RS resource set, a diversity branch, or a receive branch.

11. The first communication node of claim 9, wherein the at least one instruction, when executed, further causes the processor to generate an additional RSRP report comprising one or more RSRP values based on one of the following hierarchical associations:

each of the one or more RSRP values is determined for one beam transmitted from the second communication node and for one antenna group associated with the first communication node; or each of the one or more RSRP values is determined for one beam transmitted from the second communication node and for one antenna group associated with the first communication node and for one received beam set associated with the first communication node.

12. The first communication node of claim 9, wherein:

the at least one RSRP value is grouped into N sets of RSRP values;

each of the N sets of RSRP values is associated with a respective one of N sets of resource groups;

each of the N sets of resource groups contains at least one resource group; and

N is a positive integer.

13. A first communication node comprising a processor and a memory, wherein the memory stores at least one instruction that, when executed, causes the processor to:

send at least one reference signal to a second communication node; and receive, from the second communication node, a reference signal received power (RSRP) report comprising at least one RSRP value associated with the at least one reference signal, wherein the RSRP report is formatted in accordance with a predetermined format, wherein the predetermined format is selected from at least three different reporting formats each of which corresponds to a respective manner of determining the at least one RSRP value, the at least three different reporting formats comprising:

a first reporting format wherein the at least one RSRP value is determined for each transmitter beam transmitted from the second communication node to the first communication node;

a second reporting format wherein the at least one RSRP value is determined on a per transmitter beam basis as evaluated at the first communication node on a per receiver set basis; and a third reporting format wherein the at least one RSRP value is determined for all transmitter beams corresponding to a receiver beam set at the first communication node, wherein one of the at least one RSRP value is associated with a resource group that comprises: a received beam set, a port group, and a reference signal (RS) resource, and wherein the port group is a cluster of ports at the first communication node that is indicated to the second communication node by an explicit signal.

14. The first communication node of claim 13, wherein the resource group further comprises at least one of: an antenna group, a RS resource set, a diversity branch, or a receive branch.

15. The first communication node of claim 13, wherein the at least one instruction, when executed, further causes the processor to receive an additional RSRP report, comprising one or more RSRP values, which is generated based on one of the following hierarchical associations:
- each of the one or more RSRP values is determined for one beam transmitted from the first communication node and for one antenna group associated with the second communication node; or
- each of the one or more RSRP values is determined for one beam transmitted from the first communication node and for one antenna group associated with the second communication node and for one received beam set associated with the second communication node.

16. The first communication node of claim 13, wherein:
- the at least one RSRP value is grouped into N sets of RSRP values;
- each of the N sets of RSRP values is associated with a respective one of N sets of resource groups;
- each of the N sets of resource groups contains at least one resource group; and N is a positive integer.

* * * * *